United States Patent [19]

Peterson et al.

[11] Patent Number: 5,156,179
[45] Date of Patent: Oct. 20, 1992

[54] TENSIOMETER IRRIGATION VALVE

[75] Inventors: Donald L. Peterson, Martinsburg; D. Michael Glenn, Shepherdstown, both of W. Va.

[73] Assignee: The United States of America as represented by the Secretary of the Agriculture, Washington, D.C.

[21] Appl. No.: 764,738

[22] Filed: Sep. 24, 1991

[51] Int. Cl.$^5$ .............................................. A01G 27/00
[52] U.S. Cl. ....................... 137/78.3; 137/556; 251/63.5; 239/63
[58] Field of Search .............. 137/78.3, 556; 239/63; 251/63.5

[56] References Cited

U.S. PATENT DOCUMENTS

| | | | |
|---|---|---|---|
| 3,204,872 | 9/1965 | Whear | 137/78.3 |
| 3,874,590 | 4/1975 | Gibson | 137/78.3 |
| 3,910,300 | 10/1975 | Tal | 137/78 |
| 4,095,458 | 6/1978 | Wild | 137/78.3 |
| 4,922,945 | 5/1990 | Browne | 137/78.3 |
| 4,938,248 | 7/1990 | Browne | 137/78.3 |
| 4,987,915 | 1/1991 | Goldsmith | 137/78.3 |

*Primary Examiner*—A. Michael Chambers
*Attorney, Agent, or Firm*—M. Howard Silverstein; John D. Fado; Janelle Graeter

[57] ABSTRACT

A flow controller device includes a valve assembly connected with a tensiometer to provide automatic control of flow of water for irrigation, including variable control of the rate of flow according to the matric tension of the soil for water. The tensiometer is made of a porous cup and a connecting tube to measure this tension of the soil, which depends on the moisture and type of the soil. The valve assembly is formed of a piston moving in a cylinder, to move a rod connected to the piston. A cavity on the piston end of the cylinder connects with the tensiometer, and at the far end of the rod a flow valve is formed. As the soil dries, water moves out of the tensiometer's porous cup into the soil, reducing the pressure in the tensiometer and cylinder cavity, thereby shifting the piston to begin or increase the flow for irrigation. As soil moisture increases, water moves back into the tensiometer, increasing its pressure, thereby moving the piston to close the flow valve. A spring can be adjusted to control flow, and a scale and pressure gauge provided for calibrating the unit. The unit is self-contained and easy to manufacture, requires no outside power and can be easily calibrated by a spring adjustment for a desired flow.

8 Claims, 3 Drawing Sheets

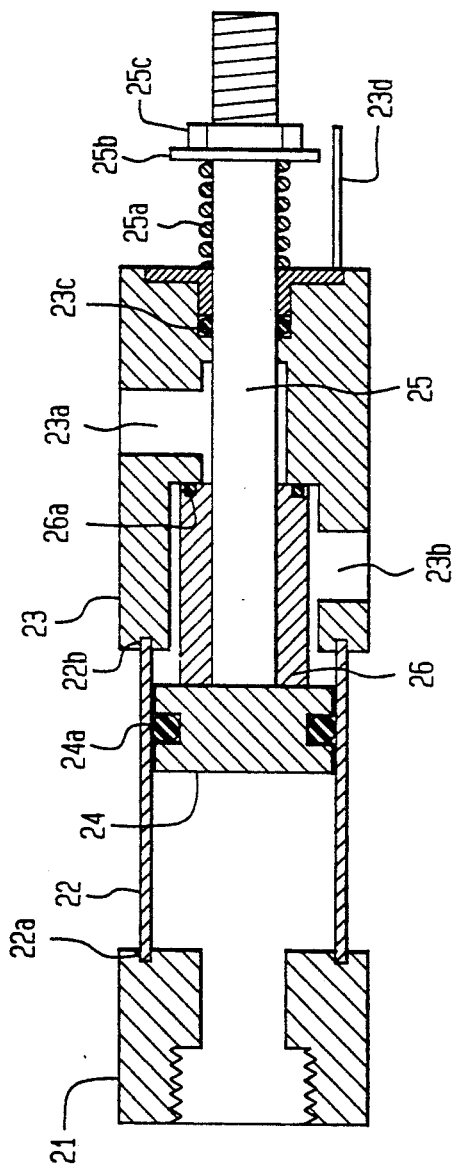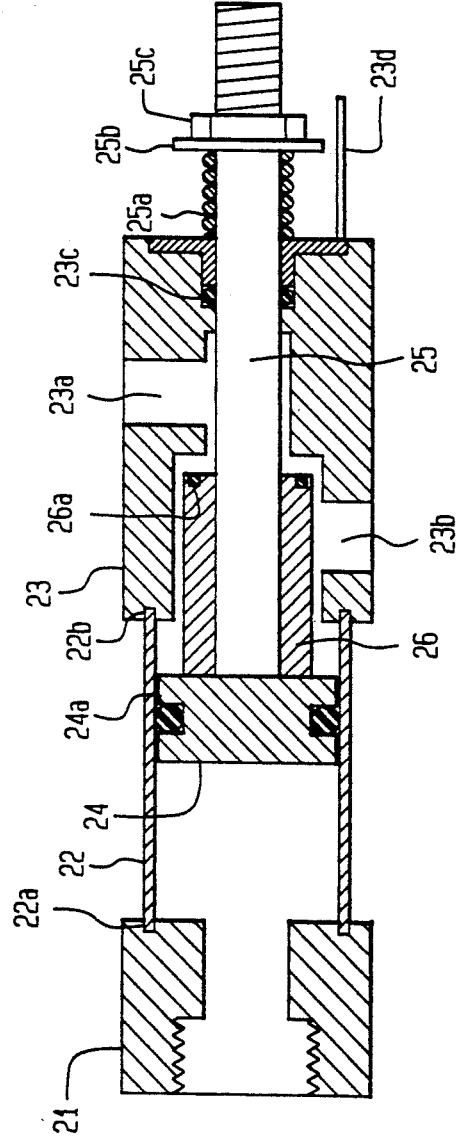

TENSIOMETER IRRIGATION VALVE

BACKGROUND OF THE INVENTION

The present invention relates generally to the control of irrigation water, and specifically to automatic irrigation systems utilizing soil-moisture tensiometers.

Tensiometers are pressure-measuring devices for measuring the matric tension (suction) of water in soil. This tension is a function of the quantity of water in a given soil sample, and depends also on the type of soil and its condition. Stated otherwise, this matric suction is a measure of how tightly the water is held to the soil particles and how available it is to plants.

Several types of soil tensiometers are known. Generally they include a tube hermetically sealed at the top, closed at the bottom by a water permeable body (e.g., porous ceramic), and often have a water refilling device. The tube is filled with deaerated water, and the water-permeable end is inserted into the soil with the tube supported in a vertical or inclined position. Water within this tube passes through the water-permeable body in either direction (i.e., into or out of the ground) in accordance with the matric tension (suction) of the soil, causing the pressure in the tensiometer to drop below the reference or ambient pressure, which is usually atmospheric pressure.

If the soil dryness is such that the water continues to escape from the tensiometer, at some point the pressure in the tensiometer falls to a level at which air enters the tensiometer, typically at $-80$ to $-100$ centibars with respect to atmospheric pressure (below atmospheric pressure). Then the tensiometer must be recharged with water for continued operation.

An example of a known automatic irrigation flow controller for use with a tensiometer is taught in U.S. Pat. No. 3,910,300 issued to Tal on Oct. 7, 1975. It employs a diaphragm as a pressure sensor, has a large number of parts, and requires electricity or a separate pilot valve for switching ON or OFF the flow of water for irrigation. The rate of irrigation flow is not variably controlled by the pilot valve, a separate main valve being referred to apparently for setting any specific quantity of flow.

SUMMARY OF THE INVENTION

An object of the invention is to provide an automatic flow control apparatus employing a tensiometer and having advantages over known devices, as is more fully discussed below. Another object is to provide an automatic irrigation system utilizing the flow control apparatus.

A further object of the invention is to provide an automatic and self-contained irrigation valve for precise control of moisture in a small area or in a larger zone of uniform soil type and irrigation requirements.

Another object of the invention is to provide an integrated valve and piston design for a simple and low cost flow controller such as for irrigation water supply.

Yet another object of the invention is to provide a flow controller which provides an irrigation flow which is proportional to soil dryness.

A further object of the present invention is to provide a flow controller which has a simple spring adjustment for determining at what level of soil dryness the irrigation flow begins.

Another object of the invention is to provide an irrigation controller employing a tensiometer which allows quick and easy in situ calibration of the pressure at which the valve opens by use of an inexpensive compression gauge to simulate the effect of the tensiometer.

A further object of the present invention is to provide a flow controller, the operation of which, is not greatly effected by the pressure of the supply water.

Another object of the invention is to provide a flow controller that operates without electricity or other external power source.

Another object of the invention is to provide a flow controller employing a tensiometer which has a quick response to change in soil moisture to keep it in a working range, so as to prevent the soil moisture from entering a range at which air enters the tensiometer, requiring recharging of the tensiometer.

Yet another object of the invention is to provide a low-cost irrigation flow controller which can be cost-effectively placed wherever needed by a variety of irrigation requirements within a given area.

A further object of the invention is to enable savings on water utilization by avoiding the application of too much water in any area.

BRIEF DESCRIPTION OF THE DRAWINGS

FIG. 2A is a cut-away side view of an embodiment of the valve assembly of the irrigation flow controller of the present invention, for low pressure irrigation systems (the valve being in the closed position).

FIG. 2B illustrates the valve assembly of FIG. 2A with the valve in the open position.

DESCRIPTION OF THE PREFERRED EMBODIMENTS

The present invention will be understood from the detailed description of the specific embodiments hereinbelow and from the respective drawings. The description and drawings of the embodiments are for explanation only, and are not intended in any way to limit the invention.

Figure 1:
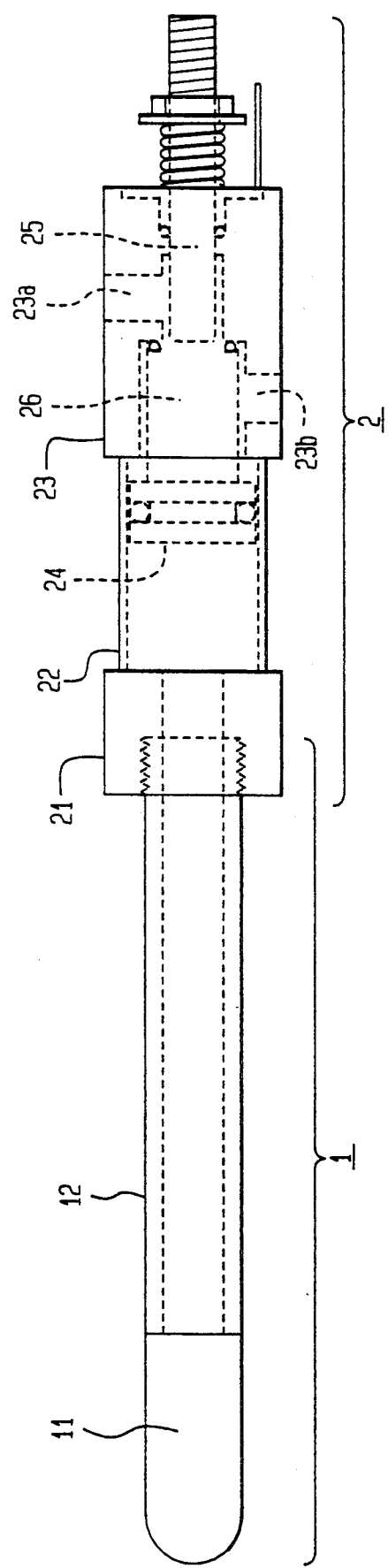
FIG. 1 shows an irrigation flow control unit according to the present invention, comprising a tensiometer connected with a valve assembly, to regulate irrigation flow according to pressure in the tensiometer.

FIG. 1 shows an irrigation flow control unit according to the present invention, comprising tensiometer means 1 connected with a pressure sensing valve assembly means 2. This is generally placed vertically in the soil, with the porous cup in contact with the soil at a location where it is desired for the soil moisture to control the flow of water for irrigation.

The components of the tensiometer means 1 include the porous cup 11 and the connecting tube 12 connected at one end to the porous cup 11. When the cavity formed by the porous cup 11 and connecting tube 12 are filled with water, the tensiometer means operates to convert soil moisture tension to pressure in the cavity, as is understood in the art and indicated above. As described in further detail below, the valve assembly means 2 includes a housing which can be formed of three components, the cylinder-end cap 21, the cylinder barrel 22 and the rod-end cap 23. A piston 24 is located in the cylinder barrel 22, to move lengthwise the rod 25 which is connected to the piston 24. The sleeve 26 about the rod 25 acts as the valve to control the flow of water between the inlet 23a for the water supply and the outlet 23b for the irrigation water.

FIG. 2A shows in more detail the valve assembly means 2 of the irrigation flow controller of the present invention, this embodiment being particularly useful for low pressure irrigation systems, wherein the pressure of the water supply is for instance 2 pounds per square inch (psi) or less. FIG. 2A shows the sleeve 26 in the closed position, and FIG. 2B shows it in an open position. Seals 22a and 22b are provided at the respective ends of the cylinder barrel 22, for sealing the cylinder barrel to the cylinder-end cap 21 and the rod-end cap 23. The two caps 21, 23 and the cylinder barrel 22 can be held together by bolts (not shown) running through the rod-end cap 23, along the cylinder barrel 22, and threaded into the cylinder-end cap 21. Alternately, the cylinder-end cap 21 and the cylinder barrel 22 can be made as one unit and cylinder barrel 22 threaded to mate with corresponding threads in rod-end cap 23. The cylinder-end cap 21 is threaded to mate and seal to the other end of the connecting tube 12.

The piston 24 is moved in the cylinder barrel 22 by the pressure in the tensiometer, and has a groove with an O-ring 24a or other similar means to form an effective seal against air and water. The cavity to the left of the piston 24, inside the cylinder barrel 22 and the cylinder-end cap 21, is in fluid communication with the water-filled cavity of the tensiometer 1 and likewise filled with water. The position of the piston 24 in the cylinder barrel 22 is thus responsive to the pressure in the tensiometer 1.

The inlet 23a in the rod-end cap 23 for connection to a supply of water and the outlet 23b for outputting the flow for irrigation, are both typically threaded. A connecting cavity in the rod-end cap 23 extends to connect between the inlet 23a and outlet 23b. The cylindrical sleeve 26, which is fitted to the piston rod 25 which in turn is connected to move with the piston 24, interfaces against a mating surface on the rod-end cap 23. Alternatively, the sleeve 26 can be connected to the piston 24 and a shorter rod can be connected to the sleeve 26.

An O-ring 26a or similar sealing means in a groove in the sleeve 26 makes the interface between the sleeve 26 and the rod-end cap 23 watertight when the sleeve 26 is in the closed position, the fit between the sleeve 26 and piston rod 25 or between the sleeve 26 and the back of the piston 24 being similarly tight. Another O-ring 23c or similar sealing device is held in position in the rod-end cap 23, providing a watertight seal around the piston rod 25. The sleeve 26 is urged to the closed position by a compressed spring 25a, a washer 25b and a nut 25c on the threaded end of the piston rod 25. A graduated scale 23d can be located on the rod-end cap 23 to extend alongside the washer 25b, to aid in setting the proper spring tension for the valve opening.

For operation, the tensiometer 1 and the piston-end cavity are filled with deaerated water. The tensiometer 1 is typically placed vertically in the soil to locate the porous cup 11 at the desired depth where the soil moisture level reflects the required irrigation flow, the connecting tube 12 being typically 6 inches to 2 or 3 feet long. The water inlet 23a is connected to the water supply line of the water for irrigation, and the outlet 23b is connected to the water distribution line(s) of the irrigation system. The distribution lines typically comprise drip emitters, micro-emitters or lateral lines of emitters.

As the soil dries and the water moves out of the porous cup 11 into the soil, the pressure in the connecting tube 12 and cavity in the cylinder-end cap 21 and cylinder barrel 22 (to the left of the piston 24 in FIGS. 2A and 2B) decreases. After sufficient drying of the soil occurs, to a point where it is desired to initiate the flow of water for irrigation, the suction in the cavity reaches a corresponding low level at which the force of the spring 25a is overcome. At this point the piston 24 and the sleeve 26 begin to move, thus opening the valve to begin irrigation. Increased soil drying causes the piston 24 to shift even further, thereby increasing the valve opening and the corresponding flow of water for irrigation.

As the soil re-wets and the wetting front reaches the vicinity of the porous cup 11, water moves back into the porous cup 11, thereby reducing the suction, that is, increasing the pressure. This action causes the piston 24 to move back toward the closed position of the sleeve 26. When sufficient water has been applied to the soil around the porous cup 11, the valve closes, to the position of FIG. 2A.

This is the action which occurs with low pressure water supply systems. When the piston 24 and sleeve 26 are shifted to begin irrigation, the irrigation supply water exerts a force on the face of the sleeve and rod-end piston. If the supply water pressure is too high, this force can be greater than the spring force needed to close the valve as the soil rewets and the suction in the tensiometer is reduced.

Figure 3:
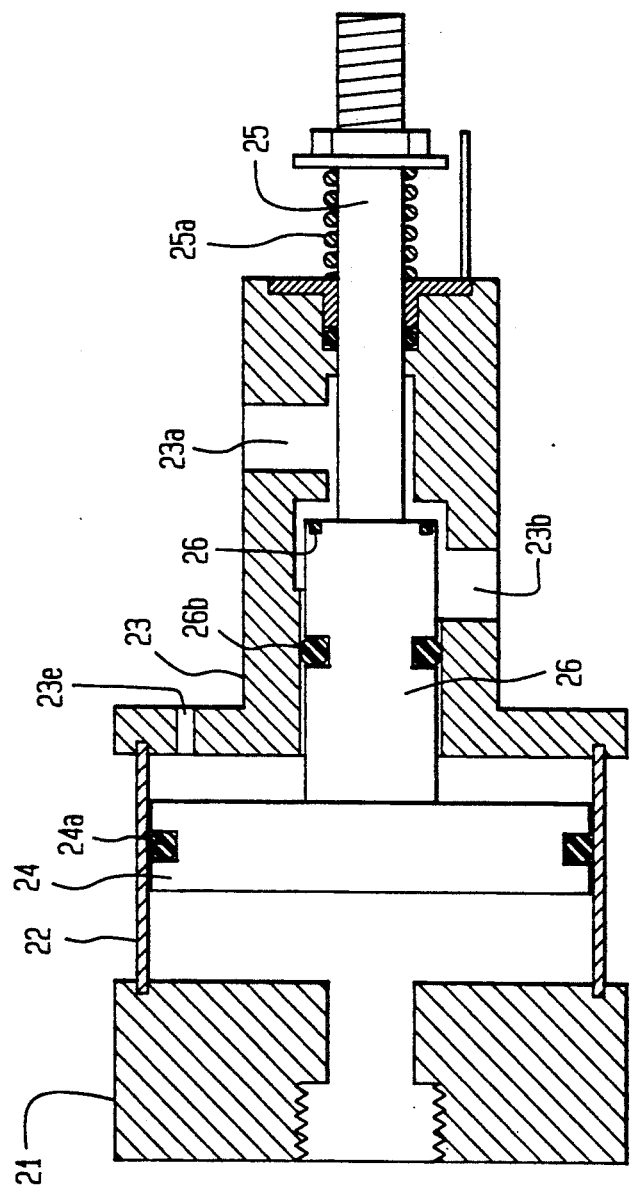
FIG. 3 shows an embodiment of the valve assembly of the irrigation flow controller of the present invention for moderate or high pressure irrigation systems.

The flow controller of the present invention can be adapted to address this situation, namely for higher pressure (greater than 2 psi) irrigation systems. FIG. 3 shows such a valve assembly with the valve in the closed position. Two design changes can be incorporated to ensure closure of the valve at pressures greater than 2 psi. The area acted on by the pressure of the water supply when the valve assembly is open can be reduced, and the area of the piston 24 that is acted upon by the tensiometer suction must be increased so that a stronger spring 25a can be used to effect closing of the valve assembly as the soil is rewetted.

As to the first goal, that of reducing the area affected by the supply water pressure, the sleeve 26 is fitted with another groove and O-ring 26b or other similar sealing means, to form a water- and air-tight seal with the wall of the rod-end cap 23. The length of the respective part of the rod-end cap 23 is extended so that the O-ring 26b maintains contact with the wall as the piston moves to the fully open position. Since this part of the wall of the rod-end cap 23 is more closely spaced from the sleeve 26 than in the embodiment of FIGS. 2A and 2B, sufficient room must be provided around the end of the sleeve 26 which mates with the rod-end cap 23 (for controlling the flow) to allow the flow to pass from the inlet 23a to the outlet 23b.

Also, a vent 23e can be provided through the wall of the rod-end cap 23 adjacent the back of the piston 24. This provides a connection to ambient pressure, thus permitting unrestricted movement of the piston, namely avoiding any effect of the high pressure of the water supply on the back of the piston 24. In this embodiment the seal between the cylinder 22 and rod-end cap 23 can be eliminated.

As to the second goal, the diameter of the cylinder 22 and piston 24 are much larger than in the low pressure embodiment. This allows use of a stronger spring 25a than in the low pressure embodiment, further decreasing the relative effect of the pressure of the water supply on the operating points of the flow controller.

The operation and components of the modified valve of FIG. 3 is otherwise similar to the embodiment of FIGS. 2A and 2B. By changing the sizes of the piston 24 and sleeve 26, and the force of the spring 25a, a wide range of values for the valve opening and closing can be provided. Depending on the design, and on friction in each individual case, different amounts of hysteresis in the operation of the valve can be experienced, that is, the difference in pressure between the opening and re-closing of the valve assembly.

An inexpensive force gauge (not shown) can also be used for calibrating the opening or closing point of the valve of the present invention. Such a gauge would be placed over the threaded end of the rod 25, to press with a desired force to move the rod against the urging of the spring 25a. The gauge may be used in this manner with the washer 25b and the scale 23d for setting the opening point of the flow control mechanism according to the present invention, that is, to adjust the spring force with the nut 25c and washer 25b to obtain the opening of the valve at a desired pressure.

By a proper sizing of the inlet 23a and outlet 23b openings and of the connecting cavity therebetween in the rod-end cap 23, it can be arranged that the soil is wetted fast enough so that the suction in the tensiometer does not reach a level where air enters into the tensiometer.

When the pressure in the porous cup drops below the air entry value, at which point air enters the tensiometer, it then becomes necessary to refill the tensiometer and valve cavity with deaerated water. This should be effectively avoided with the flow controller of the present invention, as a result of its rapid response to the level of moisture in the soil and its capability to vary the amount of flow depending upon soil moisture.

It is decidedly advantageous in several respects that the flow controller of the present invention can directly and quickly control the amount of flow depending on soil conditions. The advantages include conservation of water, and maintenance of the most appropriate level of soil moisture at a nearly constant soil moisture level if proper irrigation design arrangements are made. No pilot valve is required as in the prior art, substantially reducing the number of parts. Another important advantage is the maintenance of the water in the tensiometer (and in the cavity in the valve assembly 1 on the cylinder-end cap 21 side of the piston 24), thus reducing the need to recharge the water in the tensiometer.

In an alternative embodiment of the device of the present invention, the porous cup 11 could be located directly in the opening in the cylinder-end cap 21, for instance if the entire flow control device is sealed in a container and buried, such as to avoid freezing.

The valve assembly of the present invention may be made of many materials, such as a combination of aluminum and steel. Alternatively, plastics may be used to lower costs. Various materials and combinations will increase useful life of the device.

An irrigation flow controller according to the present invention permits more precise control of irrigation. One of the flow control devices can be positioned to give proper soil moisture to an individual plant, to a group of plants or to an area over which the soil type or moisture requirement is similar. By logical placement of several flow controller units in a field with varying water requirements, such as with different soil types and/or vegetation, more efficient use of water supplies can be achieved. Such uses of the flow controller of the present invention can better utilize precious water supplies and reduce irrigation and installation costs.

The present invention is limited only by the scope of the following claims, and not by any specifics of the embodiments disclosed above. Numerous modifications and variations within the scope of the present invention will be apparent to a skilled worker in the art in possession of the present disclosure.

| INDEX OF ELEMENTS DESIGNATED BY A NUMERAL | | | |
|---|---|---|---|
| 1 | tensiometer means | 23d | graduated scale |
| 2 | pressure sensing | 23e | vent |
|  | valve assembly means | 24 | piston |
| 11 | porous cup | 24a | o-ring |
| 12 | connecting tube | 25 | rod |
| 21 | cylinder-end cap | 25a | spring |
| 22 | cylinder barrel | 25b | washer |
| 22a | seal | 25c | nut |
| 22b | seal | 26 | sleeve |
| 23 | rod-end cap | 26a | o-ring |
| 23a | inlet | 26b | o-ring |
| 23b | outlet | | |
| 23c | o-ring | | |

What is claimed is:

1. A flow control device comprising,
   a tensiometer means for providing a variable pressure, and
   a valve assembly, including:
   a cylinder defining therein a cylinder barrel, a first end of said cylinder barrel being in fluid communication with said tensiometer means, such that said cylinder barrel is subject to said variable pressure;
   a piston provided in said cylinder barrel to sealingly slide therein in response to said variable pressure;
   a cap means connected at a second end of said cylinder barrel, said cap means defining, an inlet for receiving as an input a supply of water, an outlet for outputting a flow of said water for irrigation and a cavity extending between said inlet and said outlet;
   a rod and sleeve means connected to said piston to move therewith, including a sleeve which extends into said cavity and a rod which extends through said cavity in said cap means, said sleeve sealingly mating with a respective surface of said cap means when said piston and said sleeve are in an extreme position, said cap means and sleeve being configured such that said inlet is cut-off from said outlet when said piston and said sleeve are in said extreme position, and said rod having a first end which extends to the exterior of said cap means via an opening in said cap means; and
   urging means for urging said piston toward said extreme position and for holding said piston in said extreme position until said variable pressure from said tensiometer means reaches a threshold negative value, at which pressure said piston and said sleeve begin to move and said inlet is in fluid communication with said outlet, to allow a respective amount of flow depending on said variable pressure.

2. The device of claim 1, wherein:
   said rod is threaded on said first end,
   a threaded nut is threadedly secured to said first end of said rod,
   a washer is positioned on said first end of said rod and is held on said first end of said rod by said nut, and said urging means is a compressed spring extending between said washer and said cap means, wherein said threshold pressure at which said flow begins can be adjusted by rotating said nut to adjust positioning of said nut and thereby adjust positioning of said spring.

3. The device of claim 2, comprising
a graduated scale extending from said cap means in parallel to said rod and adjacent said washer,
whereby the position of said washer relative to said scale may be observed.

4. The device of claim 1, further including seal means located between said sleeve and an adjacent portion of said cap means, with both said inlet and outlet communicating with only a first side of said seal means, said seal means limiting flow of said water from said inlet to said outlet to be around said sleeve on only said first side of said seal.

5. The device of claim 4, wherein said cap means defines a vent hole which is in communication with a second side of said seal means.

6. An irrigation flow control device comprising:
a tensiometer means, including a porous cup, for exchanging water with soil in which said tensiometer means is placed, to produce a pressure in said tensiometer means which depends on moisture tension of said soil; and
a valve assembly means including: 1) a housing comprising a) a cylinder-end cap, wherein said cap links said valve assembly means to said tensiometer means, b) a cylinder barrel having a piston located in said cylinder barrel, the cavity of said cylinder barrel at one side of said piston being in fluid communication with said porous cup so that said piston can respond to said pressure by motion along said cylinder barrel, and c) a rod-end cap having an inlet and an outlet for flow of irrigation water; and 2) a valve means, actuated by lengthwise motion of said piston by means of a rod connected to said piston and a sleeve fitted about said rod in said cylinder barrel, for controlling flow of water for said irrigation according to said pressure by opening said inlet and said outlet to permit flow of water and by closing to stop flow of water, wherein said flow begins when said pressure in said tensiometer falls sufficiently in response to said moisture tension of said soil reducing to a respective value, and said flow continues to vary thereafter in accordance with said pressure over a range of said pressure, corresponding to soil moisture tension over a corresponding range of said moisture tension, until said soil moisture tension and said corresponding pressure rise to a level where said valve means is again closed.

7. The device of claim 6, wherein said valve assembly means functions such that said pressure at which said valve means opens to begin said flow for irrigation is slightly higher than said pressure at which said valve assembly closes to stop said flow for irrigation, thereby functioning with hysteresis and stability during cycles of operation of opening and closing of said valve means.

8. The device of claim 6, further including operably associated calibration means for calibrating said valve assembly to provide said opening of said valve means at a desired value of said pressure.

* * * * *